United States Patent
Chou et al.

(10) Patent No.: US 10,587,935 B2
(45) Date of Patent: Mar. 10, 2020

(54) SYSTEM AND METHOD FOR AUTOMATICALLY DETERMINING SERVER RACK WEIGHT

(71) Applicant: Quanta Computer Inc., Taoyuan (TW)

(72) Inventors: Kai-Pei Chou, Taoyuan (TW);
Chin-Tsai Yen, Taoyuan (TW);
Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 797 days.

(21) Appl. No.: 14/731,496

(22) Filed: Jun. 5, 2015

(65) Prior Publication Data

US 2016/0356639 A1    Dec. 8, 2016

(51) Int. Cl.
*H04Q 1/02* (2006.01)

(52) U.S. Cl.
CPC ..................... *H04Q 1/09* (2013.01)

(58) Field of Classification Search
None
See application file for complete search history.

(56) References Cited

U.S. PATENT DOCUMENTS

| | | | | |
|---|---|---|---|---|
| 5,850,539 A * | 12/1998 | Cook | ............. | G06F 17/50 703/20 |
| 2014/0031971 A1* | 1/2014 | Bridges | ............. | G11B 15/68 700/214 |
| 2015/0253821 A1* | 9/2015 | Palmer | ............. | G06F 1/189 361/679.31 |
| 2015/0256386 A1* | 9/2015 | Palmer | ............. | F24F 11/30 709/220 |
| 2015/0257302 A1* | 9/2015 | Masuyama | ............. | H05K 7/1498 713/300 |

FOREIGN PATENT DOCUMENTS

TW        201423391 A    6/2014

* cited by examiner

*Primary Examiner* — Ricky Ngon
(74) *Attorney, Agent, or Firm* — Nixon Peabody LLP; Zhou Lu

(57) ABSTRACT

A system includes a plurality of servers in a server rack and a plurality of baseboard management controllers (BMCs), each associated with a respective server from the plurality of servers. The system further includes a rack management controller (RMC). A first BMC of a first server determines component types of hardware components in the first server, determines a quantity of each of the component types in the first server, determines a first weight information of the first server based on the component types and the quantity of each of the component types, and sends to the RMC the first weight information. The RMC determines a weight of other components in the server rack, and calculates a loaded rack weight of the server rack based on the first weight information and the weight of other components.

19 Claims, 7 Drawing Sheets

500

SYSTEM AND METHOD FOR AUTOMATICALLY DETERMINING SERVER RACK WEIGHT

BACKGROUND

Field

This application relates to managed computer systems, and more particularly to a system and method for automatically determining a weight of a server rack.

Background

Computer server systems in modern data centers are commonly mounted in specific configurations on server racks for which a number of computing modules, such as trays, chassis, sleds, etc., are positioned and stacked relative on top of each other within the server racks. Rack mounted systems allow for a vertical arrangement of the computing modules to use space efficiently. Each computing module can contain one or more computer servers or may hold one or more computer server components. For example computer server components can include processors, memory, storage devices, network controllers, storage devices, cable ports, power supplies, cooling devices, etc. A server rack may need to be relocated, in which case a total weight of the server rack is useful to estimate transportation options and costs. The total weight of the server rack can greatly vary depending on the quantity and type of components in the server rack.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a method is provided for automatically determining a loaded rack weight of a server rack. A first baseboard management controller (BMC) of a first server in a server rack can determine component types of hardware components in the first server. The first BMC can determine a quantity of each of the component types. The first BMC can determine a first weight information of the first server based on the component types and the quantity of each of the component types. The first BMC can send to a rack management controller (RMC) of the server rack, the first weight information.

In some implementations, a rack management controller (RMC) of a server rack can receive from a first baseboard management controller (BMC) of a first server in the server rack, a first weight information of the first server. The RMC can receive from a second BMC of a second server in the server rack, a second weight information of the second server. The RMC can determine a weight of other components in the server rack. The RMC can calculate a loaded rack weight of the server rack based on the first weight information, the second weight information, and the weight of other components.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for automatically determining a weight of a server rack. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects.

Traditionally, to accurately determine a total weight of a server rack, the server rack must be weighed. Weighing even a single server rack can be cumbersome and time consuming Weighing a large number of server racks is even less practical. The subject disclosure provides a system and method for efficiently and accurately determining a loaded rack weight of a server rack without weighing the server rack.

Figure 1:
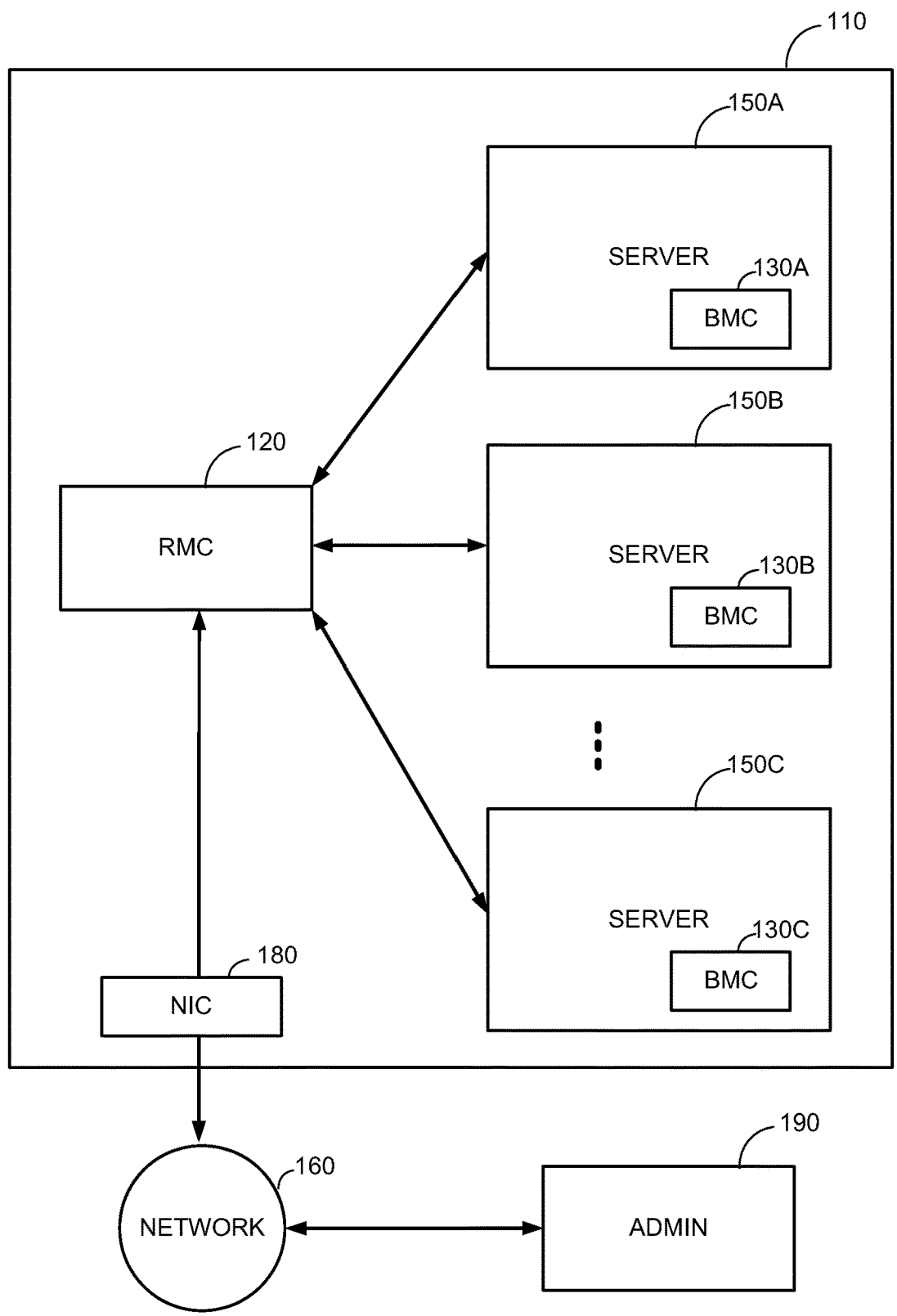
FIG. 1 illustrates a block diagram of an example system for automatically determining server rack weight.

FIG. 1 illustrates a block diagram of an example system 100 for determining server rack weight of a server rack 110. The sever rack 110 can hold a rack management controller (RMC), a number of servers 150A, 150B, . . . 150C, as well as other components (not shown). Each server 150A, 150B, . . . 150C can include a separate baseboard management controller (BMC) 130A, 130B, . . . 130C. Each BMC 130A, 130B, . . . 130C can obtain weight information for a corresponding server 150A, 150B, . . . 150C. Each BMC 130A, 130B, . . . 130C can send the weight information to the RMC 120. The RMC 120 can gather a weight of other components in the server rack 110 not already provided by the BMCs 130A, 130B, . . . 130C. The RMC 120 can thus calculate a loaded rack weight of the server rack 110 that includes all servers and other components in the server rack 110. The RMC can send the loaded rack weight over a network 160 to the administrator device 190.

Each BMC 130A, 130B, . . . 130C can include a microcontroller that manages interfaces between system management software and platform hardware. In some implementations, each BMC 130A, 130B, . . . 130C can gather weight information regarding a corresponding server 150A, 150B, . . . 150C, and send the weight information to the RMC 120. The BMC 130A, 130B, . . . 130C can determine component types (e.g. make/model, serial number, etc.) of hardware components in the corresponding server 150A, 150B, . . . 150C of the BMC 130A, 130B, . . . 130C for processors, memory, storage devices, power supply units (PSU), fans, boards, server chassis, etc. The BMC 130A, 130B, . . . 130C can additionally determine a quantity of each of the component types. In some implementations, each BMC 130A, 130B, ... 130C can send to the RMC 120 weight information that includes the component types and quantity of each corresponding server 150A, 150B, ... 150C.

For example, the component type for storage devices can be differentiated based on whether each storage device in the corresponding server 150A, 150B, ... 150C is a solid state drive (SSD) or a hard disk drive (HDD), tray size (e.g., 2.5", 3.5", etc.), or manufacturer model. The component type for processors can be differentiated by number of cores (e.g., single, dual, quad, etc.) or manufacturer (e.g., Intel, AMD, etc.). The component type for memory can be differentiated by whether each dual in-line memory module (DIMM) includes an integrated heat sink. The component type for PSU can be differentiated by wattage output or manufacturer model. The component type for fans can be differentiated by fan size (e.g., 60 mm, 80 mm, 120 mm, 200 mm, etc.).

In some implementations, each BMC 130A, 130B, ... 130C can look up a weight for each of the component types from a table or database stored on the BMC. The table or database can store weights for various component types. In some other implementations, each BMC 130A, 130B, ... 130C can look up the weight for each of the component types from a table or database that is accessible through the network 160. In yet some other implementations, each BMC 130A, 130B, ... 130C can directly query hardware components of each corresponding server 150A, 150B, ... 150C to obtain weights for each component type. Each BMC 130A, 130B, ... 130C can then send to the RMC 120 weight information of each corresponding server 150A, 150B, ... 150C that include weights of each of the component types.

In some implementations each BMC 130A, 130B, ... 130C can store a board and chassis weight of each corresponding server 150A, 150B, ... 150C in a non-volatile memory such as an electrically erasable programmable read-only memory (EEPROM). Each BMC 130A, 130B, ... 130C can send to the RMC 120 the board and chassis weight each corresponding server 150A, 150B, ... 150C.

In some implementations, each BMC 130A, 130B, ... 130C can calculate a server weight of each corresponding server 150A, 150B, ... 150C based on the component weight of each of the component types and the quantity of each of the component types. Each BMC 130A, 130B, ... 130C can then send to the RMC 120 weight information that includes the server weight of each corresponding server 150A, 150B, ... 150C.

In some implementations, the RMC 120 can determine weights of each of the component types in the servers 150A, 150B, ... 150C determined by each corresponding BMC 130A, 130B, ... 130C. In some implementations, the RMC 120 can look up a weight for each of the component types from a table or database stored on the RMC 120. The table or database can store weights for various component types. In some other implementations, the RMC 120 can look up the weight for each of the component types from a table or database that is accessible by the RMC 120 through the network 160.

In some implementations, the RMC 120 can gather additional information regarding the server rack 110 not already provided by the BMCs 130A, 130B, ... 130C. For example, the additional information can include an empty rack weight and a weight of an Ethernet switch. In some implementations, the additional information can be obtained from a user of the administrator device 190 through a user interface. In some implementations, the RMC 120 can determine a weight of other components in server rack 110. In some implementations, the weight of the other components is based on an empty rack weight and an Ethernet switch weight, which can also be obtained from the user of the administrator device 190.

The RMC 120 can calculate and send a loaded rack weight of the server rack 110 over a network 160 to the administrator device 190. In some implementations, the RMC can calculate the loaded rack weight of the server rack 110 based on the weight information for each of the servers 150A, 150B, ... 150C in the server rack 110 and the weight of other components in the server rack 110.

The RMC 120 can include a microcontroller that manages the entire server rack 110 in a similar manner that each BMC 130A, 130B, ... 130C monitors a corresponding server 150A, 150B, ... 150C. In some implementations, the RMC 120 can monitor the health and status of the rack server, gather weight information from each BMC 130A, 130B, ... 130C, perform weight calculations, as well as communicate over the network 160 with the administrator device 190. The RMC 120 can connect to the network 160 using a network interface controller (NIC) 180.

In some implementations, the RMC 120 can communicate with the BMCs 130A, 130B, ... 130C using the Intelligent Platform Management Interface (IPMI) protocol. IPMI is a set of specifications for an autonomous computer subsystem that manages and monitors a computer system's central processing unit (CPU), firmware, and operating system, and for out-of-band management and monitoring by system administrators. The BMCs 130A, 130B, ... 130C can connect to the RMC 120 using any bus interface such as system management bus (SMBus), RS-232 serial bus, Inter-Integrated Circuit (IIC or I$^2$C) protocol, Ethernet, Intelligent Platform Management Bus (IPMB), etc. The IIC protocol features a multi-master, multi-slave, single-ended, serial computer bus that uses a Serial Data Line and a Serial Clock Line with a 7-bit or a 10-bit address space. The SMBus protocol features a single-ended, two-wire bus derived from IIC protocol and uses IIC hardware and IIC addressing.

The NIC 180 can include computer hardware components that allow a computing device to communicate over the network 160. The NIC 180 can connect to the administrator device 190 through the network 160. The network 160 can, for example, include a local area network (LAN) or a wide area network such as the Internet. The administrator device 190 can be a device such as a computer system that can send command or inputs to the RMC 120 as well as receive information from the RMC 120.

Figure 2:
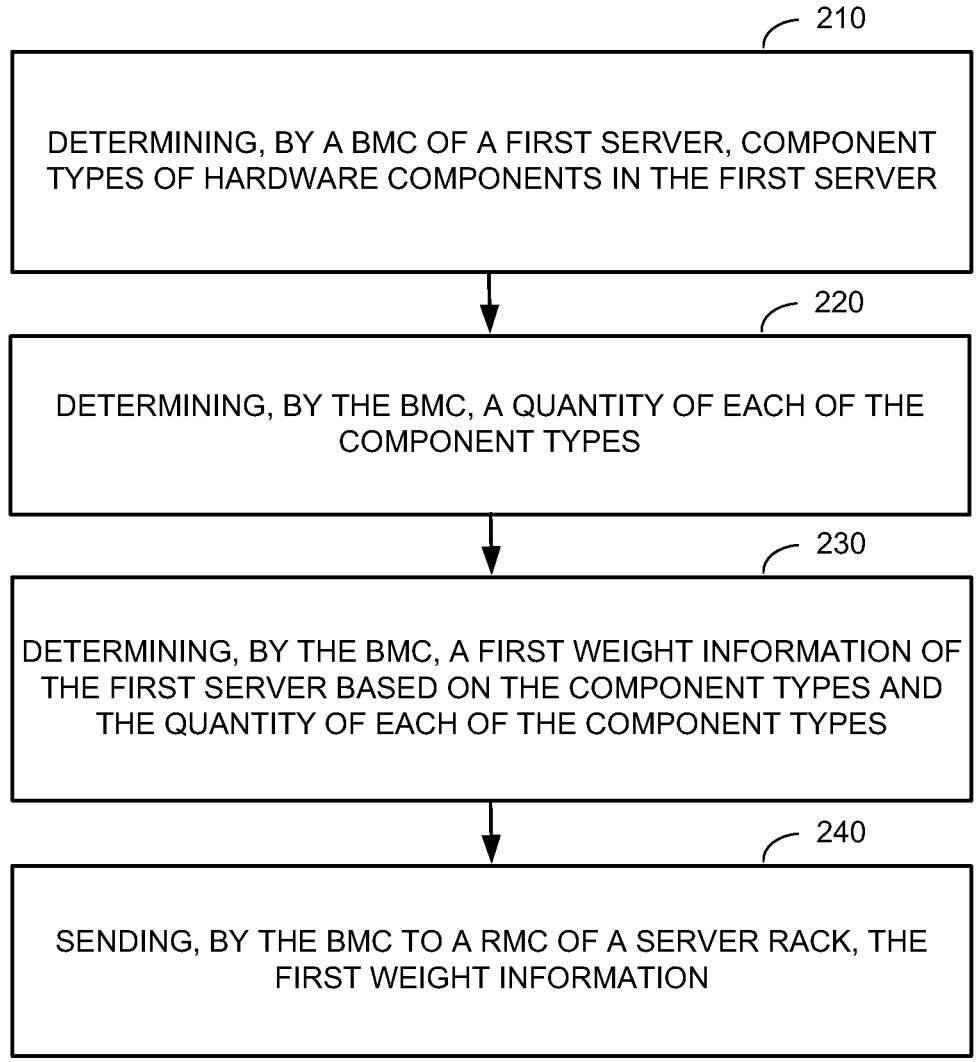
FIG. 2 illustrates an example method for automatically determining server rack weight by a BMC.

FIG. 2 illustrates an example method 200 for automatically determining server rack weight by a BMC. At step 210, a first baseboard management controller (BMC) of a first server in a server rack can determine component types of hardware components in the first server. In some implementations, the component types can include various storage drive model types. The first BMC can determine a drive weight for each of the storage drive model types. In some implementations, the component types can include various storage drive tray sizes. The first BMC can obtain a drive weight for each of the plurality of storage drive tray sizes. In some implementations, the first BMC can query a database to obtain a component weight for each the component types. In some implementations the first BMC can store a board and chassis weight of the first server in a non-volatile memory, where the first weight information is further based on the board and chassis weight.

At step 220, the first BMC can determine a quantity of each of the component types. In some implementations, the first BMC can obtain from a host bus adapter (HBA) the component types and the quantity of each of the component types. In some implementations, the first BMC can obtain from a Serial Attached Small Computer System Interface (SAS) expander the component types and the quantity of each of the component types. In some implementations, the first BMC can obtain from a Basic Input/Output System (BIOS) the component types and the quantity of each of the component types.

At step 230, the first BMC can determine a first weight information of the first server based on the component types and the quantity of each of the component types. In some implementations, the first BMC can calculate a first server weight of the first server based on the component weight of each of the component types and the quantity of each of the component types, where the first weight information includes the first server weight.

At step 240, the first BMC can send to a rack management controller (RMC) of the server rack, the first weight information.

Figure 3:
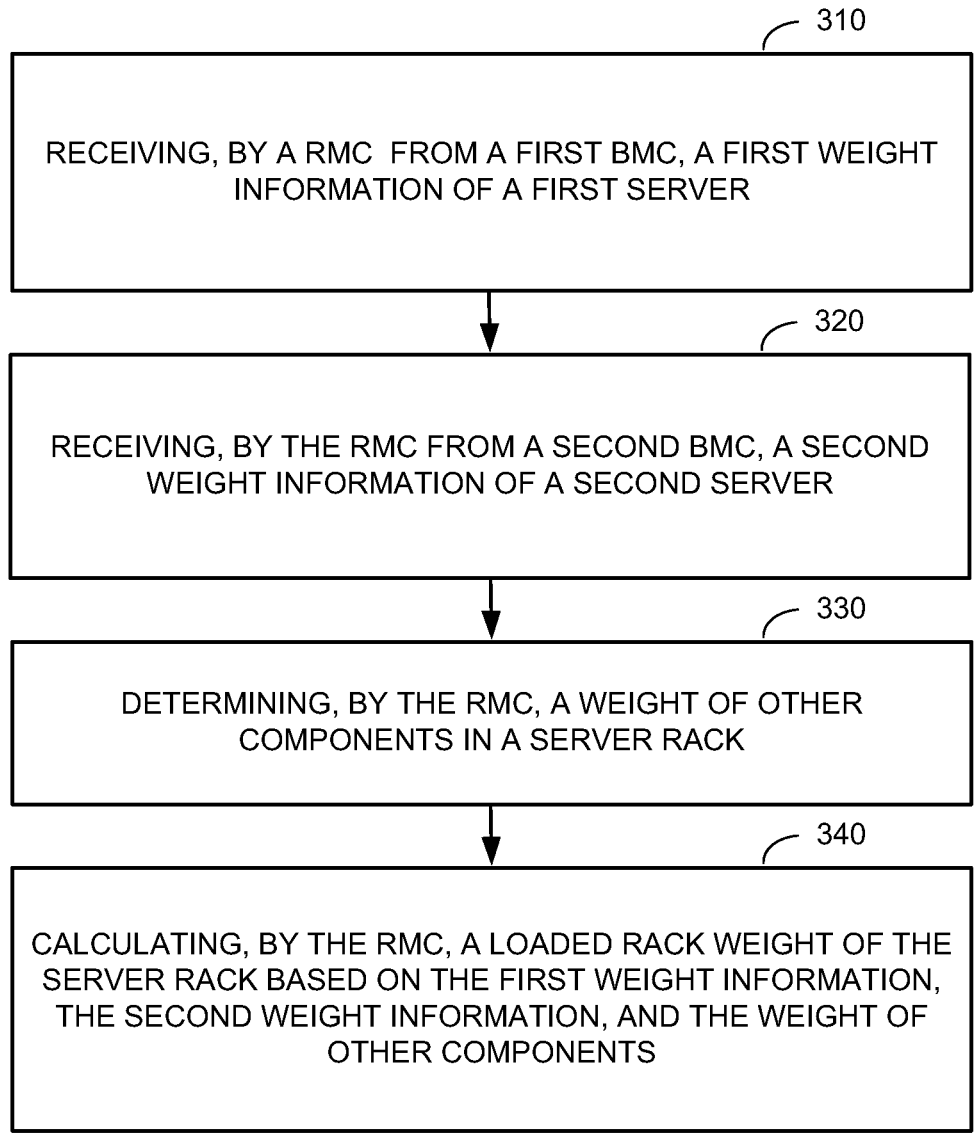
FIG. 3 illustrates an example method for automatically determining server rack weight by a RMC.

FIG. 3 illustrates an example method 300 for automatically determining server rack weight by a RMC. At step 310, a rack management controller (RMC) of a server rack can receive from a first baseboard management controller (BMC) of a first server in the server rack, a first weight information of the first server.

At step 320, the RMC can receive from a second BMC of a second server in the server rack, a second weight information of the second server.

In some implementations, the RMC can query a database to obtain a component weight for each component type disclosed by the first weight information and the second weight information.

At step 330, the RMC can determine a weight of other components in the server rack. In some implementations, the weight of other components is based on an empty rack weight and an Ethernet switch weight.

At step 340, the RMC can calculate a loaded rack weight of the server rack based on the first weight information, the second weight information, and the weight of other components.

Figure 4:
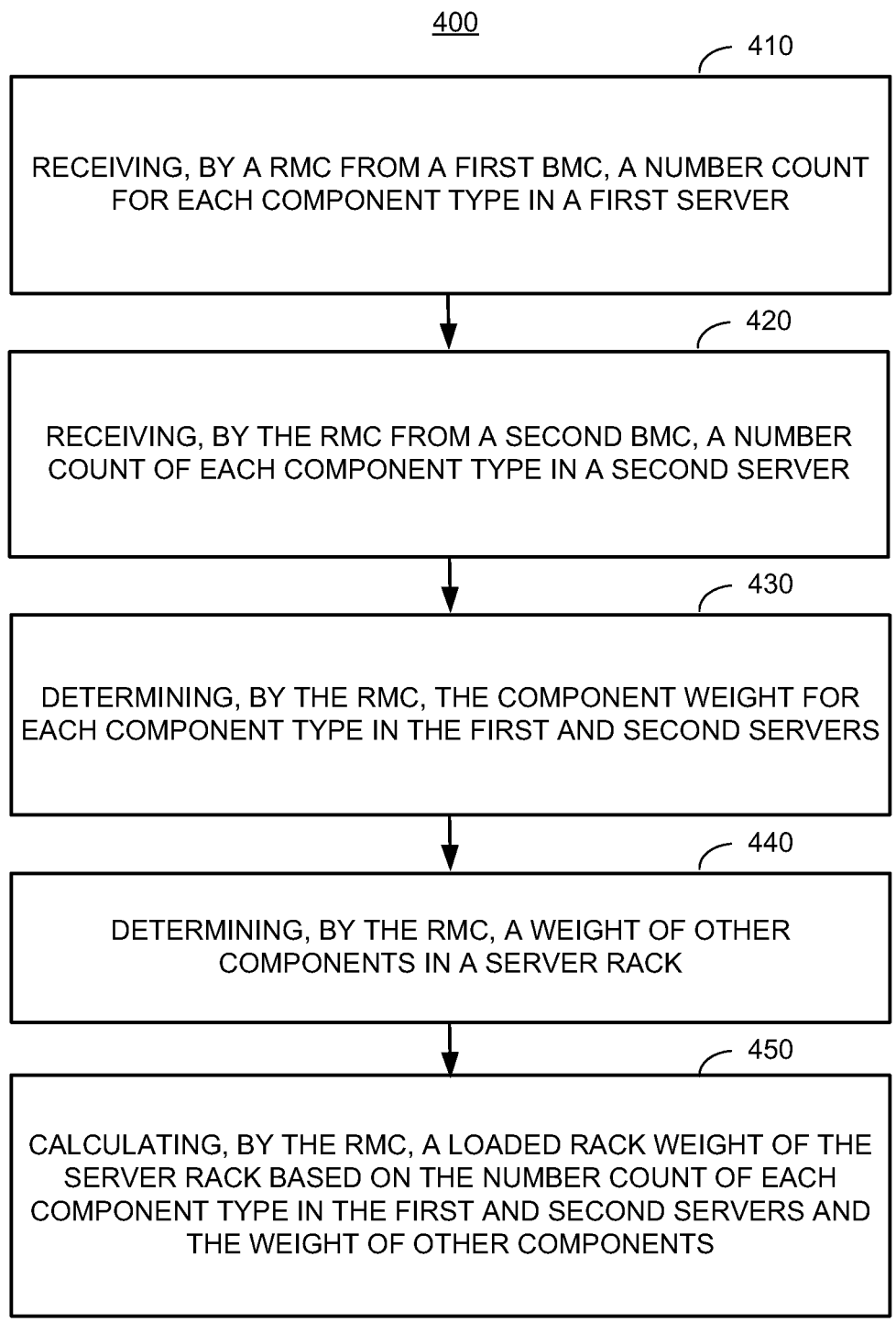
FIG. 4 illustrates another example method for automatically determining server rack weight by a RMC.

FIG. 4 illustrates another example method 400 for automatically determining server rack weight by a RMC. At step 410, a rack management controller (RMC) of a server rack can receive from a first baseboard management controller (BMC) of a first server in the server rack, a number count for each component type in the first server.

At step 420, the RMC can receive from a second BMC of a second server in the server rack, a number count for each component type in the second server.

In some implementations, the RMC can receive from one or more additional BMCs, one or more number counts for component types in one or more additional servers.

At step 430, the RMC can determine a component weight for each component type in the first and second servers. In some implementations, the RMC can query a database to obtain the component weight for each component type in the first and second servers.

At step 440, the RMC can determine a weight of other components in the server rack. In some implementations, the weight of other components is based on an empty rack weight and an Ethernet switch weight.

At step 450, the RMC can calculate a loaded rack weight of the server rack based on the number count of the number count of each component type in the first and second servers and the weight of other components.

Figure 5:
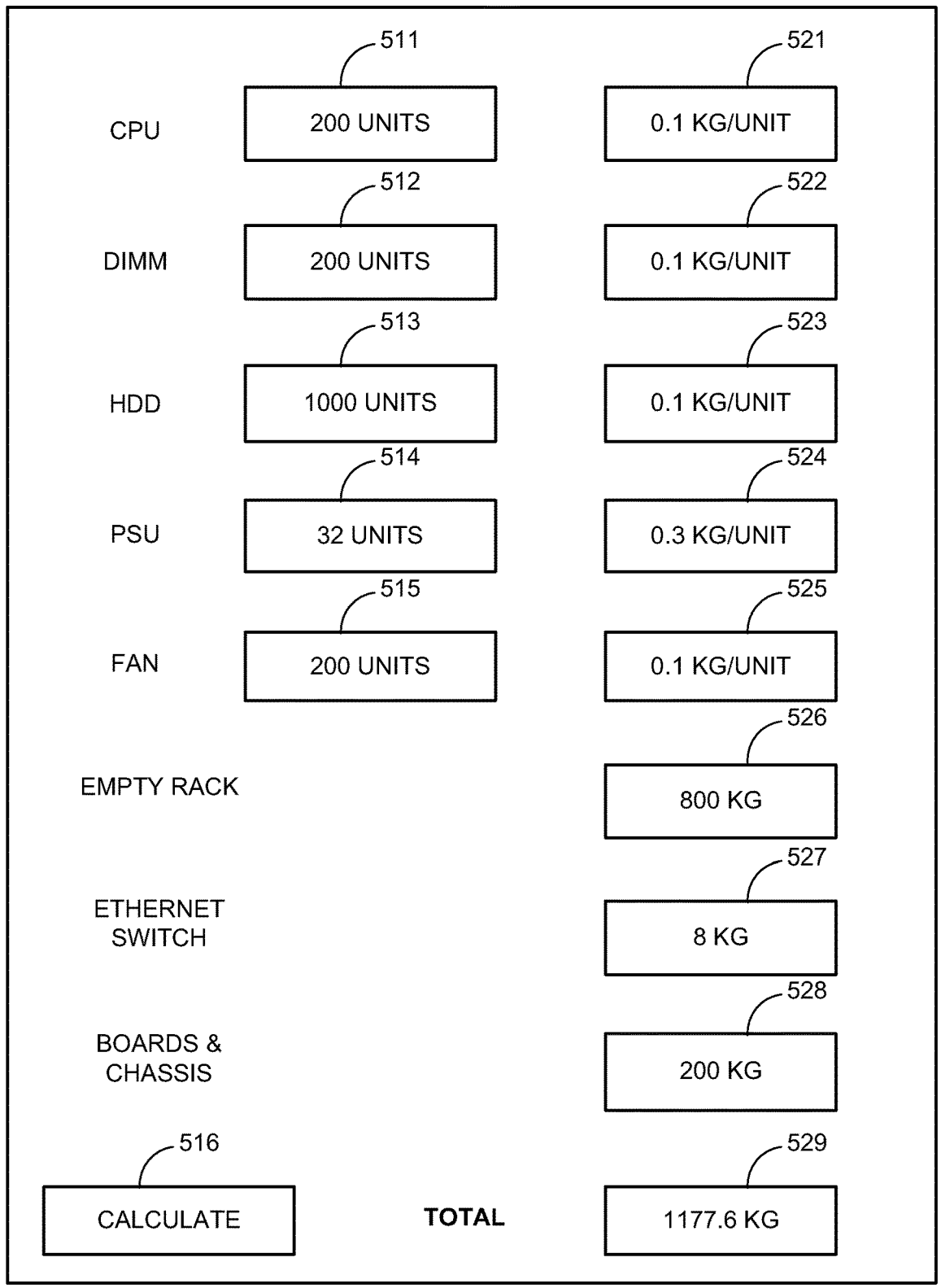
FIG. 5 illustrates a block diagram of an example user interface for user entry of weight information.

FIG. 5 illustrates a block diagram of an example user interface 500 for user entry of weight information. A RMC can provide the user interface 500 to a user of an administrator device to obtain information that is not automatically or otherwise obtained. For example, the user interface 500 can include boxes indicating a number of units for central processing units (CPU), DIMMs, HDDs, PSUs, and Fans (e.g., 511, 512, 513, 514, and 515, respectively). Further, the user interface 500 can include dialog boxes for the user to input weight per unit measurements for central processing units (CPU), DIMMs, HDDs, PSUs, Fans, an empty rack, an Ethernet switch, boards, and chassis of various types, configurations, or models. (e.g., 521, 522, 523, 524, 525, 526, 527, and 528, respectively). In some implementations, the user interface 500 can include separate inputs for different types, sizes, or models of HDDs (e.g., 2.5" tray size SSDs, 2.5" tray size HDDs, 3.5" tray size HDDs), CPUs, DIMMs, etc. In some implementations, the user interface 500 can further include a button 516 for the user to calculate a total rack weight of a loaded server rack, which can then be shown in box 529 of the user interface 500.

Figure 6:
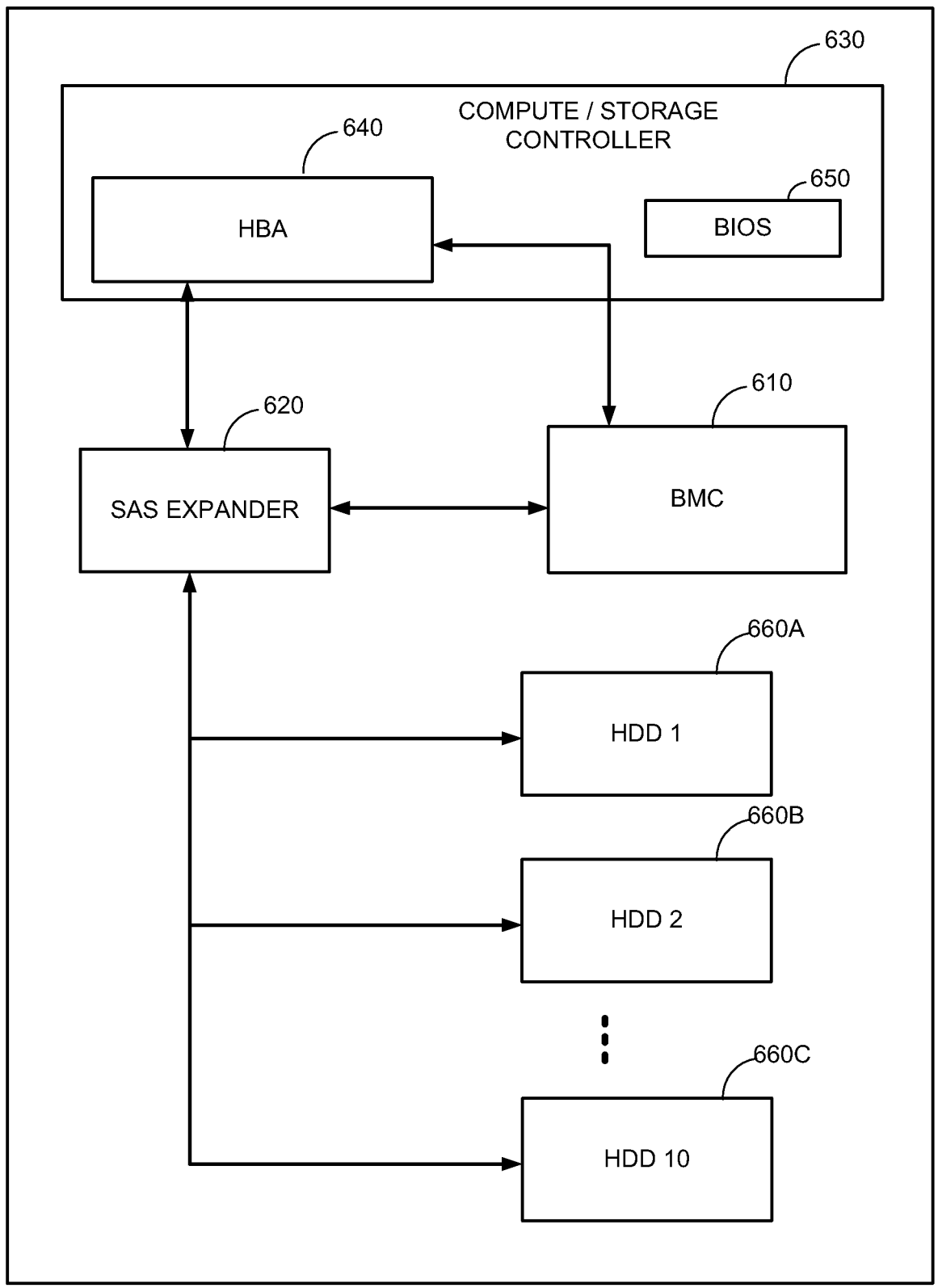
FIG. 6 illustrates a block diagram of an example system for obtaining weight information of storage devices.

FIG. 6 illustrates a block diagram of an example system 600 for obtaining weight information of storage devices. The system 600 can be a single server 600 among a number of servers in a server rack. The system 600 can include a BMC 610 that collects weight information of one or more HDDs 660A, 606B, 660C. The weight information of the storage devices can include component type information (e.g., manufacturer model, tray size, etc.) that can be used to determine a weight of the storage device or the actual device weight. In some implementations, the BMC 610 can query each storage device 660A, 660B, 660C for a weight value.

In some implementations, the BMC 610 can obtain the weight information of the storage devices 660A, 660B, 660C from a Basic Input/Output System (BIOS) 650 of a compute/storage controller 630 of the server 600. The BIOS 650 can turn obtain the weight information from the storage devices 660A, 660B, 660C. For example, the weight information can include identification for component types of the storage devices 660A, 660B, 660C and a quantity of each of the identified component types. In some implementations, the BMC 610 can send the storage device types and quantities for the system 600 to a RMC.

In some implementations, the BMC 610 can obtain weight information for the storage devices 660A, 660B, 660C from a host bus adapter (HBA) 640 and/or a Serial Attached Small Computer System Interface (SAS) expander 620. The HBA 640 can function to connect network and storage devices using a bus interface such as Serial Advanced Technology Attachment (SATA), IDE, Ethernet, FireWire, Universal Serial Bus (USB), etc. The SAS expander 620 can function to connect the server 600 to a large number (e.g., 128 or more) of storage devices such as the storage devices 660A, 660B, 660C.

In some implementations, the BMC 610 can store a table or database that includes a weight value for each different storage device type for use in weight calculations. For example, the table can list 2.5" HDD a static weight of 0.3 kg, 3.5" HDD a weight of 0.4 kg, 2.5" SSD a weight of 0.1 kg, 3.5" SSD a weight of 0.2 kg, etc. In some implementations, the table or database is predetermined storing the weight values for each different storage device type. In some other implementations, the BMC 610 can obtain the weight of the different storage device types by prompting a user of an administrator device. The table or database can be stored in a non-volatile memory such as an EEPROM. In some implementations, the BMC 610 can send the weight of each of the storage devices 660A, 660B, 660C in the system 600 to a RMC.

The BMC 610 can determine a quantity of each of the storage device types in the server 600. The BMC 610 can then calculate a weight of all storage devices in the server 600 by multiplying the quantity of each of the storage device types with the static weight value of the storage device type, then summing the resultant product for each of the storage device types. In some implementations, the BMC 610 can send the calculated weight of all the storage devices 660A, 660B, 660C in the server 600 to the RMC.

Figure 7:
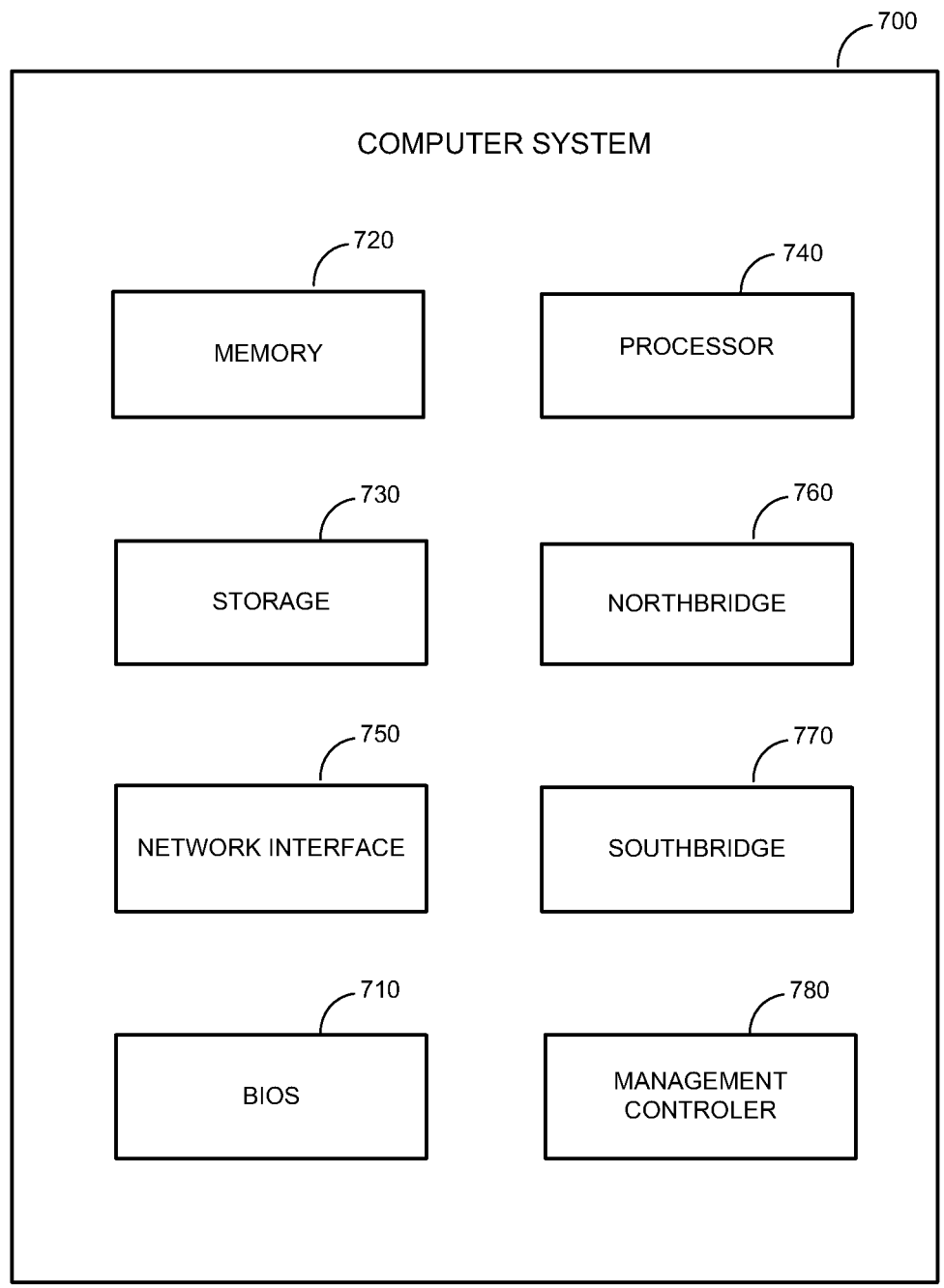
FIG. 7 illustrates a block diagram of an example computer system.

FIG. 7 illustrates a block diagram of an example computer system 700. The computer system 700 can include a processor 740, a network interface 750, a management controller 780, a memory 720, a storage 730, a BIOS 710, a northbridge 760, and a southbridge 770.

The computer system 700 can be, for example, a server (e.g., a server in a server rack of a data center) or a personal computer. The processor (e.g., central processing unit (CPU)) 740 can be a chip on a motherboard that can retrieve and execute programming instructions stored in the memory 720. The processor 740 can be a single CPU with a single processing core, a single CPU with multiple processing cores, or multiple CPUs. One or more buses (not shown) can transmit instructions and application data between various computer components such as the processor 740, memory 720, storage 730, and networking interface 750.

The memory 720 can include any physical device used to temporarily or permanently store data or programs, such as various forms of random-access memory (RAM). The storage 730 can include any physical device for non-volatile data storage such as a HDD or a flash drive. The storage 730 can have a greater capacity than the memory 720 and can be more economical per unit of storage, but can also have slower transfer rates.

The BIOS 710 can include a Basic Input/Output System or its successors or equivalents, such as an Extensible Firmware Interface (EFI) or Unified Extensible Firmware Interface (UEFI). The BIOS 710 can include a BIOS chip located on a motherboard of the computer system 700 storing a BIOS software program. The BIOS 710 can store firmware executed when the computer system is first powered on along with a set of configurations specified for the BIOS 710. The BIOS firmware and BIOS configurations can be stored in a non-volatile memory (e.g., NVRAM) or a ROM such as flash memory. Flash memory is a non-volatile computer storage medium that can be electronically erased and reprogrammed.

The BIOS 710 can be loaded and executed as a sequence program each time the computer system 700 is started. The BIOS 710 can recognize, initialize, and test hardware present in a given computing system based on the set of configurations. The BIOS 710 can perform self-test, such as a Power-on-Self-Test (POST), on the computer system 700. This self-test can test functionality of various hardware components such as hard disk drives, optical reading devices, cooling devices, memory modules, expansion cards and the like. The BIOS can address and allocate an area in the memory 720 in to store an operating system. The BIOS 710 can then give control of the computer system to the OS.

The BIOS 710 of the computer system 700 can include a BIOS configuration that defines how the BIOS 710 controls various hardware components in the computer system 700. The BIOS configuration can determine the order in which the various hardware components in the computer system 700 are started. The BIOS 710 can provide an interface (e.g., BIOS setup utility) that allows a variety of different parameters to be set, which can be different from parameters in a BIOS default configuration. For example, a user (e.g., an administrator) can use the BIOS 710 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 780 can be a specialized microcontroller embedded on the motherboard of the computer system. For example, the management controller 780 can be a baseboard management controller (BMC). The management controller 780 can manage the interface between system management software and platform hardware. Different types of sensors built into the computer system can report to the management controller 780 on parameters such as temperature, cooling fan speeds, power status, operating system status, etc. The management controller 780 can monitor the sensors and have the ability to send alerts to an administrator via the network interface 750 if any of the parameters do not stay within preset limits, indicating a potential failure of the system. The administrator can also remotely communicate with the management controller 780 to take some corrective action such as resetting or power cycling the system to restore functionality.

The northbridge 760 can be a chip on the motherboard that can be directly connected to the processor 740 or can be integrated into the processor 740. In some instances, the northbridge 760 and the southbridge 770 can be combined into a single die. The northbridge 760 and the southbridge 770, manage communications between the processor 740 and other parts of the motherboard. The northbridge 760 can manage tasks that require higher performance than the southbridge 770. The northbridge 760 can manage communications between the processor 740, the memory 720, and video controllers (not shown). In some instances, the northbridge 760 can include a video controller.

The southbridge 770 can be a chip on the motherboard connected to the northbridge 760, but unlike the northbridge 760, is not directly connected to the processor 740. The southbridge 770 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 700. The southbridge 770 can connect to or can include within the southbridge 770 the management controller 770, Direct Memory Access (DMAs) controllers, Programmable Interrupt Controllers (PICs), and a real-time clock.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more example designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A system, comprising:
a plurality of servers in a server rack;
a plurality of baseboard management controllers (BMCs), each associated with a respective server from the plurality of servers;
a rack management controller (RMC),
wherein a first BMC from the plurality of BMCs associated with a first server from the plurality of servers determines component types of hardware components in the first server based upon collected basic input/output system (BIOS) information, determines a quantity of each of the component types in the first server based upon the collected BIOS information, determines a first weight information of the first server based on the component types and the quantity of each of the component types, and sends to the RMC the first weight information, wherein the hardware components in the first server comprise at least one of central processing unit (CPU), power supply unit (PSU), dual in-line memory module (DIMM), or hard disk drive (HDD), wherein the first BMC is a specialized microcontroller embedded on a motherboard of the first server and manages an interface between system management software and platform hardware of the first server,
wherein the RMC determines a weight of other components in the server rack, and calculates a loaded rack weight of the server rack based on the first weight information and the weight of other components such that the server rack is capable of being efficiently relocated.

2. The system of claim 1, wherein a second BMC from the plurality of BMCs associated with a second server from the plurality of servers sends to the RMC a second weight information of the second server, and wherein the loaded rack weight is further calculated based on the second weight information.

3. The system of claim 1, wherein the RMC sends the loaded rack weight to a network interface controller (NIC) for transmission over a network to a computing device.

4. The system of claim 1, wherein the first BMC stores a board and chassis weight of the first server in a non-volatile memory.

5. The system of claim 1, wherein the RMC provides a user interface to a user for inputting a weight of each of the component types and the weight of other components.

6. A method, comprising:
determining, by a first baseboard management controller (BMC) of a first server in a server rack, component types of hardware components in the first server based upon collected basic input/output system (BIOS) information, wherein the hardware components in the first server comprise at least one of central processing unit (CPU), power supply unit (PSU), dual in-line memory module (DIMM), or hard disk drive (HDD), wherein the first BMC is a specialized microcontroller embedded on a motherboard of the first server and manages an interface between system management software and platform hardware of the first server;
determining, by the first BMC, a quantity of each of the component types based upon the collected BIOS information;
determining, by the first BMC, a first weight information of the first server based on the component types and the quantity of each of the component types; and
determining, by subsequent BMC, the weight information of all other servers in the server rack to obtain the weight information of the entire server rack;
sending, by the first, and subsequent BMCs to a rack management controller (RMC) of the server rack, the entire server rack weight information such that the server rack is capable of being efficiently relocated.

7. The method of claim 6, further comprising storing, by the first BMC, a board and chassis weight of the first server in a non-volatile memory, wherein the first weight information is further based on the board and chassis weight.

8. The method of claim 6, wherein the component types comprise a plurality of storage drive model types.

9. The method of claim 8, further comprising obtaining, by the first BMC, a drive weight for each of the plurality of storage drive model types.

10. The method of claim 6, wherein the component types comprise a plurality of storage drive tray sizes.

11. The method of claim 10, further comprising obtaining, by the first BMC, a drive weight for each of the plurality of storage drive tray sizes.

12. The method of claim 6, further comprising querying, by the first BMC, a database to obtain a component weight for each the component types.

13. The method of claim 6, further comprising obtaining, by the first BMC from a host bus adapter (HBA), the component types and the quantity of each of the component types.

14. The method of claim 6, further comprising obtaining, by the first BMC from a Serial Attached Small Computer System Interface (SAS) expander, the component types and the quantity of each of the component types.

15. The method of claim 6, further comprising obtaining, by the first BMC from a Basic Input/Output System (BIOS), the component types and the quantity of each of the component types.

16. The method of claim 6, further comprising calculating, by the first BMC, a first server weight of the first server based on the component weight of each of the component types and the quantity of each of the component types, wherein the first weight information comprises the first server weight.

17. A method, comprising:
receiving, by a rack management controller (RMC) of a server rack from a first baseboard management controller (BMC) of a first server in the server rack, a first weight information of the first server, wherein the hardware components in the first server comprise at least one of central processing unit (CPU), power supply unit (PSU), dual in-line memory module (DIMM), or hard disk drive (HDD), wherein the first BMC is a specialized microcontroller embedded on a motherboard of the first server and manages an interface between system management software and platform hardware of the first server, and is configured to determine component types of hardware components and a quantity of each of the component types in the first server based upon collected basic input/output system (BIOS) information;
receiving, by the RMC from a second BMC of a second server in the server rack, a second weight information of the second server;
determining, by the RMC, a weight of other components in the server rack; and
calculating, by the RMC, a loaded rack weight of the server rack based on the first weight information, the second weight information, and the weight of other components, such that the server rack is capable of being efficiently relocated.

18. The method of claim 17, wherein the weight of other components is based on an empty rack weight and an Ethernet switch weight.

19. The method of claim 17, further comprising querying, by the RMC, a database to obtain a component weight for each component type disclosed by the first weight information and the second weight information.

* * * * *